(12) United States Patent
Heusinger et al.

(10) Patent No.: US 11,347,324 B2
(45) Date of Patent: May 31, 2022

(54) INDUSTRIAL TRUCK COMPRISING A DRIVER DISPLAY

(71) Applicant: Jungheinrich Aktiengesellschaft, Hamburg (DE)

(72) Inventors: Sebastian Heusinger, Hamburg (DE); Fabien Tozzi, Hamburg (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 0 days.

(21) Appl. No.: 16/296,839

(22) Filed: Mar. 8, 2019

(65) Prior Publication Data
US 2019/0278385 A1 Sep. 12, 2019

(30) Foreign Application Priority Data

Mar. 8, 2018 (DE) .................. 10 2018 105 410.6

(51) Int. Cl.
G06F 3/023 (2006.01)
B60K 35/00 (2006.01)
B60K 37/06 (2006.01)
B66F 9/24 (2006.01)
B66F 9/075 (2006.01)
B66F 9/20 (2006.01)

(52) U.S. Cl.
CPC ............ G06F 3/0238 (2013.01); B60K 35/00 (2013.01); B60K 37/06 (2013.01); B66F 9/0759 (2013.01); B66F 9/20 (2013.01); B66F 9/24 (2013.01); B60K 2370/122 (2019.05); B60K 2370/139 (2019.05); B60K 2370/152 (2019.05); B60Y 2200/15 (2013.01)

(58) Field of Classification Search
CPC . G06F 3/0238; B66F 9/20; B66F 9/24; B60K 2370/122; B60K 2370/139; B60K 2370/152; B60Y 2200/15
See application file for complete search history.

(56) References Cited

U.S. PATENT DOCUMENTS

| 6,218,741 B1 * | 4/2001 | Braun .................. B60S 1/0822 15/DIG. 15 |
| 2006/0031465 A1 * | 2/2006 | Ahya .................. H04M 1/7258 709/224 |
| 2006/0173594 A1 * | 8/2006 | Kolletzki ........... H04N 5/44543 701/36 |
| 2011/0210918 A1 * | 9/2011 | Kodama ............... G06F 3/0213 345/163 |

(Continued)

FOREIGN PATENT DOCUMENTS

| CN | 102043468 A | 5/2011 |
| EP | 2993155 B1 | 11/2017 |

OTHER PUBLICATIONS

CN 201910174069; filed Mar. 8, 2019; Office Action dated Oct. 12, 2021 (10 pages).

*Primary Examiner* — Alexander Eisen
*Assistant Examiner* — Nathaniel P Brittingham
(74) *Attorney, Agent, or Firm* — Barclay Damon LLP

(57) ABSTRACT

An industrial truck comprising a driver display and at least one manually actuable operating element, which is assigned a plurality of function keys. A toggle key is provided for the function keys, whereupon actuation of the toggle key, a second function is assigned to at least one of the function keys. The second function is a function that can be selected in a driver-specific manner.

20 Claims, 3 Drawing Sheets

(56) References Cited

U.S. PATENT DOCUMENTS

| | | | | |
|---|---|---|---|---|
| 2012/0173075 A1* | 7/2012 | Mays | ............... | B60W 10/184 |
| | | | | 701/34.2 |
| 2012/0303237 A1* | 11/2012 | Kumar | .................. | B61L 3/006 |
| | | | | 701/93 |
| 2013/0275907 A1* | 10/2013 | Lau | ................... | G06F 3/04886 |
| | | | | 715/773 |
| 2015/0197205 A1* | 7/2015 | Xiong | ............... | B60R 16/037 |
| | | | | 701/49 |
| 2015/0210287 A1* | 7/2015 | Penilla | ............... | B60W 40/08 |
| | | | | 701/49 |
| 2016/0041801 A1* | 2/2016 | Morita | ............... | G06F 3/1257 |
| | | | | 358/1.14 |
| 2016/0062644 A1* | 3/2016 | Adams | ............. | G06F 3/04886 |
| | | | | 715/763 |
| 2017/0129427 A1* | 5/2017 | Park | ..................... | B60K 35/00 |
| 2018/0261091 A1* | 9/2018 | Hernandez-Urbina | .................... | |
| | | | | G08G 1/096716 |
| 2019/0278385 A1* | 9/2019 | Heusinger | ........... | G06F 3/0238 |

\* cited by examiner

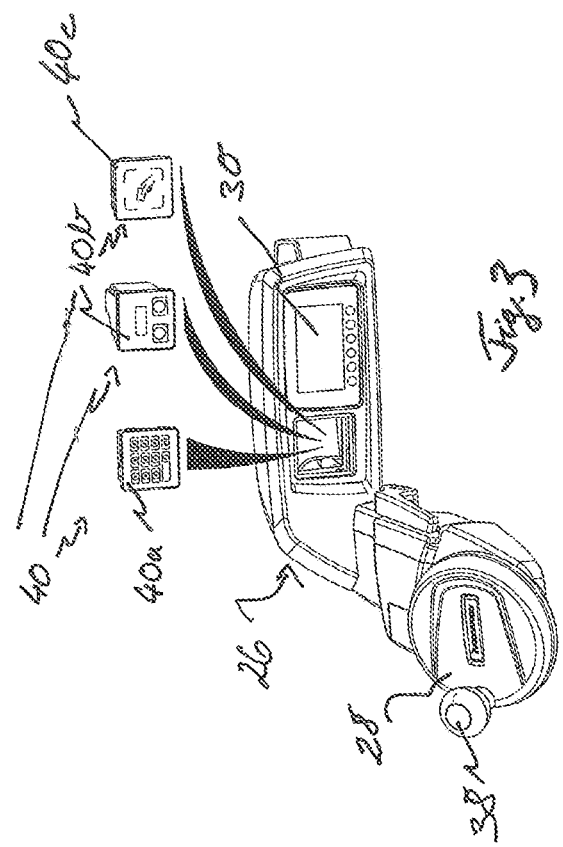
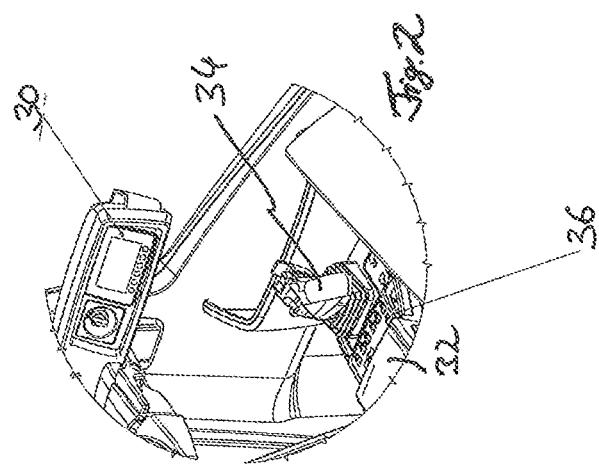

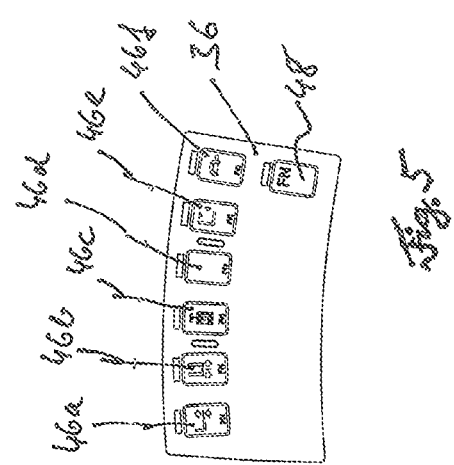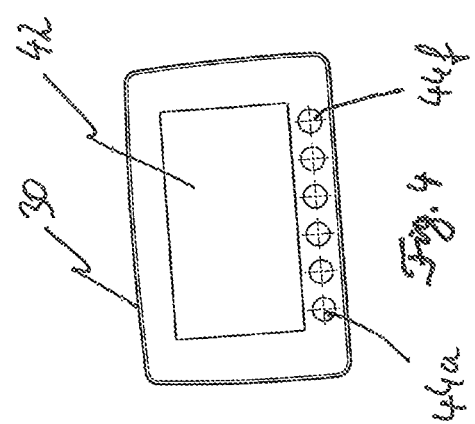

INDUSTRIAL TRUCK COMPRISING A DRIVER DISPLAY

CROSS REFERENCE TO RELATED INVENTION

This application is based upon and claims priority to, under relevant sections of 35 U.S.C. § 119, German Patent Application No. 10 2018 105 410.6, filed Mar. 8, 2018, the entire contents of which are hereby incorporated by reference.

TECHNICAL FIELD

The present disclosure relates to an industrial truck comprising a driver display and at least one manually actuable operating element. Furthermore, a plurality of function keys are assigned to the manually actuable operating element in a spatially adjacent manner.

BACKGROUND

Industrial trucks having an operating console for the driver, for example, reach trucks or other forklift trucks, often comprise a driver display for which information on the current operating state of the vehicle and/or vehicle functions to be carried out are displayed to the driver. It is also known to equip the industrial truck with a series of function keys, the actuation of which directly triggers a predefined vehicle function. Function keys of this kind enable the driver to use functions on the vehicle in a convenient manner without having to grasp or release the operating element in order to select and carry out functions on the driver display.

An industrial truck is known from EP 2 993 155 B1 which is equipped with a control computer for activating driving and work functions as well as at least one display and operating device. A preselection of lifting heights is provided for simple operation of the industrial truck, a predetermined lifting height being automatically approached and its attainment being displayed. A menu for selecting the desired lifting height is provided in the display and operating device by means of a control computer. It is possible for the user to change the preselection. Furthermore, it is also known to provide freely programmable favorite switching elements to which a lifting height can be attained. The height may be selected via a favourite switching device or element. A lifting height can be freely assigned to the favorite switching elements by the operator.

In light of the occasion highly complex nature of industrial truck operation, the fact that rigidly predefined function keys cannot sufficiently represent the relevant number of required operating and vehicle functions without there needing to be a bewilderingly large number of rigidly predefined function keys has proven to be disadvantageous.

BRIEF SUMMARY OF THE INVENTION

This disclosure provides an industrial truck comprising a driver display wherein a plurality of vehicle functions can be called up in a simple and obvious manner so as to ensure ergonomic operation.

The industrial truck according to the present disclosure comprises a driver display and at least one manually actuable operating element. A plurality of function keys are arranged so as to be spatially adjacent to the operating element, which may, for example, have a joystick or other steering/operating lever. The spatial proximity of the function keys to the operating element allows for ergonomic operation.

According to the disclosure, a toggle key is provided for the function keys, upon actuation of which toggle key a second function is assigned to at least one of the function keys. The second function can be called up via the corresponding function key for a predetermined period of time after actuation of the toggle key. As an alternative to the predetermined period of time, the second function may be called up permanently via the corresponding function key until the toggle key is actuated once more. Advantageously, the second function is a function that can be freely programmed in a driver-specific manner and can be assigned as the second function of a function key by the driver themselves according to their wishes and preconceptions without involvement of a servicing technician, IT professional or other aid.

The industrial truck according to the disclosure offers a variety of options by virtue of the driver display. Firstly, the number of vehicle functions that can be conveniently called up using a function key that can be doubled without increasing the number of function keys to be operated. If every function key is assigned a second function, twice as many vehicle functions are available to choose from. Another advantage relates to a second function being selectable in a driver-specific manner. For example, a first driver can assign a vehicle function B to a function key A as a second function, another driver can assign a vehicle function C to the same function key. This creates pairs of vehicle functions (A, B), (B, C) that are defined in a driver-specific manner as dependent on the driver logged in on the vehicle.

In one embodiment, the toggle key is configured to switch to a programming mode for more than a predetermined minimum period of time when actuated. In the programming mode, by activating an operating function and actuating a function key to be assigned a second function, the function key is assigned the activated operating function as the second function. After switching to the programming mode by actuating a function key, the function key is activated to assume its second function. If an operating function is, then selected, and activated, for example, by means of selection via the driver display, the function key is assigned the operating function as its second function.

In another embodiment, the driver display is equipped with one or more operating elements. The operating elements provided on the driver display are used to display and select vehicle functions via the driver display. The vehicle functions selected via the driver display can be activated directly or assigned to one of the function keys as a second function. With regard to the layout of the operating elements provided on the driver display, it is important that the selection of a vehicle function always works immediately, regardless of whether the vehicle function is intended to be switched on/activated or whether the vehicle function is intended to be selected as a second function for a function key. This makes intuitive operation and intuitive assignment of driver-specific functions especially possible. In another embodiment of the industrial truck, a memory unit and a driver login unit are provided. In this way, when a driver logs in on the driver login unit, the driver-specific second functions are loaded from the memory unit and, when the driver logs out, the driver-specific second functions are saved in the memory unit. The memory unit makes it possible to provide the second functions for a driver as needed and to assign the second functions to a driver. The driver is identified by means of the driver login unit, and, thereafter, the assigned second functions are called up and provided.

In another embodiment, the assigned second functions are displayed on the driver display when the toggle key is actuated. The individual functions are shown on the display next to each other in an obvious sequence, in the same way as the second functions are assigned to the function keys. By displaying the second functions again, they are recalled by the driver and thus better memorized. This also facilitates intuitive operation. In order to avoid confusion, the second functions are only displayed after the toggle key has been actuated. By re-actuating the toggle key, the display of the second functions can be ended. By re-actuating the toggle key, the possibility of triggering the second function by actuating the function key is also ended.

In another embodiment, the toggle key is arranged so as to be spatially adjacent to the operating element, such that the operator does not have to reach across the display or completely let go of the operating element.

BRIEF DESCRIPTION OF THE DRAWINGS

Various embodiments of the disclosure are explained in greater detail below based on an exemplary industrial truck. In the following:

FIG. 2 shows a detailed view of the steering unit and operating element according to the disclosure, FIG. 3 shows the steering unit comprising the driver display and several exemplary driver login units as access modules, FIG. 4 shows the driver display and the operating keys thereof, and FIG. 5 shows the function keys and an associated toggle key.

DETAILED DESCRIPTION OF THE INVENTION

Figure 1:
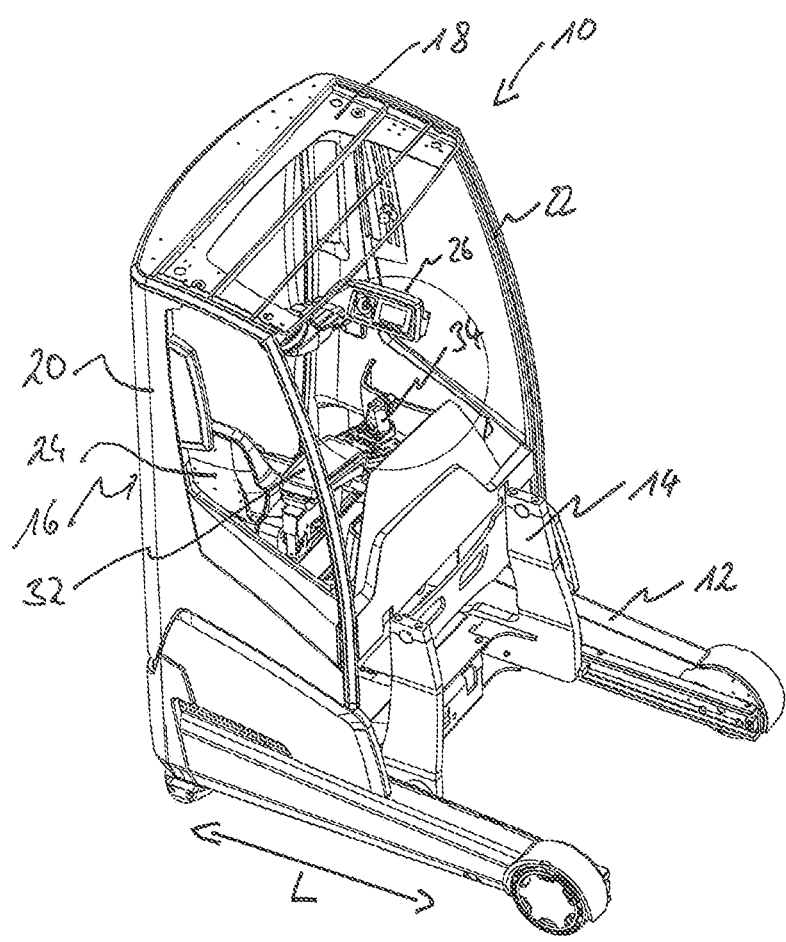
FIG. 1 shows a perspective view from the load side into the driver's cab of a reach truck, wherein the lift mast is not shown.

FIG. 1 shows a reach truck 10 comprising two protruding wheel arms 12 and a mast base 14 mounted on the wheel arms so as to be slidable. For greater clarity, the lift mast arranged on the mast base 14 is not shown. The reach truck 10 comprises a driver's cab 16 having an overhead guard 18 which is supported by four pillars 20, 22. The pillars 20 designed as A-pillars are located on the side facing away from the wheel arms 12, whereas the B-pillars 22 are provided on the side of the driver's cab 16 facing toward the lift mast. A driver's seat 24 is oriented transversely to a vehicle longitudinal direction L and is arranged in the driver's cab 16. The transverse orientation of the driver's seat 24 causes the driver to move sideways when the reach truck moves along the longitudinal direction L. A steering unit 26 comprises a steering wheel 28 (cf. FIG. 3) and a driver display 30 is provided opposite the driver's seat. It can further be seen in FIG. 1 that an armrest 32 is provided to the side of the driver's seat 24 on the side facing toward the mast base 14. The armrest 32 serves to support the lower arm of a driver sitting in the driver's seat 24. With their right hand, the driver can grip and actuate an operating lever 34.

FIG. 2 shows a detail from FIG. 1, wherein the operating lever 34 and the driver display 30 can each be seen. The right lower arm of the operator rests on the armrest 32, wherein the wrist does not rest thereon and remains free for better mobility. The operating lever 34 can be gripped entirely or in part. It is also possible to move the operating lever 34 using just the fingertips. A panel 36, comprising function keys, is arranged between the armrest 32 and the operating lever 34. The panel 36 is arranged such that it can also be operated with a lower arm resting on the armrest 32. For operation, the function keys in the panel 36 are pushed for example using the index finger or middle finger, and if the hand remains on the operating lever, the thumb may also be used to operate the function keys. It is also possible to actuate the function keys 36 with a hand while other fingers are used to actuate the operating lever 34.

FIG. 3 shows the steering unit 26 in detail. The steering unit 26 comprises a steering wheel 28 which can be gripped and turned by means of a knob 38, for example. Preferably, the knob 38 is in the left-hand position at 9 o'clock so as to facilitate operation with the left hand. Furthermore, a driver login unit 40 is provided in the steering unit. FIG. 3 shows three different driver login units. One driver login unit may include a keypad 40a for inputting a PIN. Another unit may include a card reader 40b which reads out a driver-specific identification card. Yet another option for a driver login unit includes a chip reader 40c for reading a personal driver chip card for example to provide different techniques for exchanging data. These techniques may include for example a transponder card, RFID or another form of near-field communication.

One of the three driver login units 4a, 40b, 40c may be inserted into the steering unit 26 and connected to the vehicle and its steering.

As shown in FIG. 4, the driver display 30 comprises a display screen 42, which may also be designed as a touch-screen, for example. Six operating elements 44a-44f may be designed as push buttons provided below the display screen 42. Using the push buttons, operating variables and vehicle functions may be displayed and selected in a simple menu guide. The operating elements below the display screen 42 may also be assigned permanent functions for operation of the vehicle. However, the operating elements 44 on the steering unit 26 are arranged for the driver in such a way that they cannot be actuated at the same time as the operating lever 34, but rather the operating lever 34 must first be released in order to actuate the operating elements (in one-hand operation).

FIG. 5 shows the panel 36 comprising the function keys 46a to 46f, which are individually assigned a permanently preconfigured function. For example, the function key 46a orients the load fork horizontally and the function key 46b orients a side shifter centrally relative to the vehicle. A weighing function in the vehicle is triggered by the function key 46c and function key 46e orients the load receiving means centrally between the load arms of an industrial truck in order to prevent collisions during the lowering process. Function key 46f defines a low-speed run for the vehicle. Function key 46d is not defined in the embodiment shown. In addition to the function keys 46, a toggle key 48 is provided. The toggle key 48 activates the second function of the function keys. Therefore, the second function may for example be activated for a predetermined period of time, for example a few seconds, by means of the toggle key 48. Within this period of time, the second functions are shown on the display screen 42. As an alternative to the predetermined period of time, it is also possible for the toggle key 48 to activate the second functions until the toggle key is pressed again.

If the toggle key is activated, a lighting system directed onto the load part may for example be provided as a second function for the function key 46a in addition to the horizontal orientation of the load fork. In this case, the operator first actuates the function key 46a in order to orient the load fork horizontally, and subsequently, the toggle key 48 in order to activate the lighting system directed onto the load forks by re-actuating the function key 46a. The second function may also be assigned to the function key 46f for the low-speed run in a similarly simple manner, for example. Therefore, as a second function in addition to the low-speed run, an all-round lighting system on the vehicle may be switched on in order to alert other participants of the low-speed run.

When using the vehicle according to the disclosure, various operating situations can be distinguished:

Actuation of the Second Function:

If the toggle key 48 is not switched on, it can be switched on by pressing a key on the key panel. An LED may be provided to optically show that the toggle key 48 is activated. If the toggle key 48 is switched on, the second functions saved for the function keys 46 are displayed in an obvious manner on the display screen 42 in the form of symbols. The positioning of the symbols corresponds to the order of the function keys 46. If one of the function keys 46 is then actuated, the stored second function, and not the primary stored function, is executed. When the function key is actuated, the toggle key returns to its initial non-actuated state.

Assigning the Second Function:

In order to assign the second function, the toggle key is pressed continuously for a specific period of time, for example longer than 3 seconds. By keeping the toggle key pressed down, all function keys 46 start to flash, for example. If one of the function keys has already been assigned a second function, this can also be shown on the display screen 42. One of the function keys 46, regardless of whether they have not yet been assigned a second function or have already been assigned a second function, is selected by actuating the function key. Subsequently, a special function can be selected from the menu, preferably using the operating keys 44 on the display screen 42, and activated as the second function for the selected function key. For example, an all-round lighting system for the vehicle can be activated in a submenu. If this function is activated on the display screen 42, the function can be saved as the second function of the previously selected function key. The toggle key then returns to its initial position and the assignment process is completed. The second functions are functions which can be programmed by the driver themselves and for the selection and setting of which the driver requires no external assistance.

Person-Specific Second Functions:

The driver identifies themselves on a recognition unit in order to use the industrial truck. This may be done using a PIN, an identification card or a chip. Using this personal login, a person-specific user profile can be activated. The profile contains the second functions for the function keys, for example. If the operator changes the second function assignment while still logged in on the vehicle, this will be saved when the operator logs off or exits the vehicle and will automatically be available to the driver again when they log in the next time.

LIST OF REFERENCE NUMBERS

10 Reach truck
12 Wheel arms
14 Mast base
16 Driver's cab
18 Overhead guard
20 A-pillars
22 B-pillars
24 Driver's seat
26 Steering unit
28 Steering wheel
30 Driver display
32 Armrest
34 Operating lever
36 Panel comprising function keys
38 Knob
40 Driver login unit
40a Keypad
40b Card reader
40c Chip reader
42 Display screen
44a-f Operating elements
46a-f Function keys
48 Toggle key

The invention claimed is:

1. An industrial truck comprising:
a driver display:
at least one function key, having a first function, the first function being a permanent preconfigured operating function of the industrial truck, and further configured to be assigned a second function, the second function being an operating function of the industrial truck that is selected from a plurality of operating functions and assigned to the at least one function key by the driver;
a toggle key con figured to,
enable the driver to assign the second function to the at least one function key when the toggle key is pressed continuously for a specific period of time, and navigate between the first function and the second function assigned to the at least one function key;
a memory unit; and a driver login unit, wherein the memory unit is configured to load the second function of each of the at least one function key that was previously assigned by the driver when the driver logs in on the driver login unit, and wherein the second function of each of the at least one function key is saved in the memory unit when the driver logs out on the driver login unit.

2. The industrial truck according to claim 1, wherein the toggle key is configured to switch to a programming mode wherein following actuation of the toggle key, the at least one function key may be assigned the second function for a predetermined minimum period of time.

3. The industrial truck according to claim 1, wherein the driver display comprises a touchscreen, and wherein operating variables and vehicle instructions may be displayed and selected in a menu guide.

4. The industrial truck according to claim 1, wherein upon actuation of the toggle key, the assigned second functions are displayed on the driver display.

5. The industrial truck according to claim 4, wherein the assigned second functions are displayed at least for a predetermined period of time.

6. The industrial truck according to claim 4, wherein re-actuation of the toggle key terminates the display of the second function.

7. The industrial truck according to claim 5, wherein re-actuation of the toggle key terminates the display of the second functions.

8. The industrial truck according to claim 1, wherein re-actuating the toggle key terminates activation of the second function.

9. The industrial ruck according to claim 1, wherein the toggle key is spatially adjacent to an operating element.

10. The industrial truck according to claim 1, wherein, when the toggle key is actuated, the second functions for the at least one function key can be activated for a predetermined period of time.

11. A method for operating an industrial truck having a driver display and a plurality of function keys, comprising the steps of:
   actuating a toggle key to activate one of the plurality of function keys, wherein each of the plurality of function keys operates a predetermined first function, and a second function,
   selecting the second function from a plurality of operating functions, and
   assigning the second function to the at least one of the plurality of function keys via the toggle key when the toggle key is pressed continuously for a specific period of time,
   which second function is selected and assigned by the driver themselves;
   storing the second function assigned by the driver when the driver logs out of a login unit; and
   associating the second function assigned by the driver with the driver that assigned the second functions.

12. The method according to claim 11 wherein the step of actuating the toggle key includes the step of:
   switching to a programming mode wherein following actuation of the toggle key, each of the plurality of function keys may be assigned the second function for a predetermined minimum period of time.

13. The method according to claim 11 further comprising the steps of:
   logging into the industrial truck by the login unit;
   loading driver-specific second functions via a memory unit when a driver logs in via the login unit; and
   saving the driver-specific second functions in the memory unit when the driver logs out.

14. The method of claim 11 wherein the step of actuating the toggle key includes the step of:
   displaying the assigned second functions on a driver display.

15. The method of claim 14 wherein the step of displaying the assigned second functions on a driver display includes the step of:
   displaying the assigned second functions for at least a predetermined period of time.

16. The method of claim 14 further comprising the step of:
   re-actuating the toggle key to terminate the display of the second functions on the driver display.

17. An industrial truck comprising:
   a driver display;
   a plurality of function keys each having a first function, the first function being a permanent preconfigured operating function of the industrial truck;
   a driver login unit in communication with the industrial truck;
   a toggle key configured to activate at least one of the plurality of function keys, wherein, upon actuation of the toggle key, the driver can switch between a predetermined first function assigned to the at least one of the plurality of function keys and a second function assigned to the at least one of the plurality of function keys, wherein the toggle key is further configured to switch to a programming mode wherein the second function can be programmed by the driver themselves, following actuation of the toggle key, the at least one function key may be assigned the second function for a predetermined minimum period of time; and
   a memory unit configured to store the second function programmed by the driver when the driver logs out of the login unit and associate the second function with the driver who programmed them,
   wherein the second function is an operating function of the industrial truck that is selected from a plurality of operating functions and assigned to the at least one of the plurality of function key by the driver,
   wherein the memory unit is configured to load the second function associated with the driver who programmed them into the industrial truck when the driver who programmed them logs in using the driver login unit,
   wherein the driver display is used to activate a vehicle function,
   wherein the driver display is used to assign the vehicle function to one of the function keys as the second function, and
   wherein re-actuation of the toggle key terminates the display of the second function and the activation of the second function.

18. The industrial truck according to claim 1, wherein the plurality of operating functions comprises at least one of:
   activation of a lighting system around the industrial truck; and
   activation of a lighting system directed onto a load part of the industrial truck.

19. The method according to claim 11, wherein the plurality of operating functions comprises at least one of:
   activation of a lighting system around the industrial truck; and
   activation of a lighting system directed onto a load part of the industrial truck.

20. The industrial truck according to claim 17, wherein the plurality of operating functions comprises at least one of:
   activation of a lighting system around the industrial truck; and activation of a lighting system directed onto a load part of the industrial truck.

* * * * *